United States Patent [19]
Hill et al.

[11] 3,812,458
[45] May 21, 1974

[54] POWER SUPPLY WITH UNIDIRECTIONAL CURRENT FLOW FOR A PNEUMATIC TIRE LOW PRESSURE MONITORING AND WARNING SYSTEM

[75] Inventors: Charles E. Hill, Lynn; William R. Brobeck, Richmond, both of Ind.

[73] Assignee: Avco Corporation, Richmond, Ind.

[22] Filed: Sept. 15, 1972

[21] Appl. No.: 289,697

[52] U.S. Cl. ................................. 340/58, 325/111
[51] Int. Cl. ........................................... B60c 23/04
[58] Field of Search ........ 340/58; 200/61.22, 61.25, 200/61.26; 325/15, 111, 117

[56] References Cited
UNITED STATES PATENTS
3,694,803  9/1972  Strenglein ............................ 340/58
3,588,815  6/1971  Koonce ................................. 340/58

Primary Examiner—Alvin H. Waring
Attorney, Agent, or Firm—Bertram H. Mann

[57] ABSTRACT

An electrical circuit for eliminating severe voltage fluctuations in a battery power supply and providing a substantially constant voltage to an associated output connection and a pneumatic tire low pressure monitoring and warning system using such circuit is provided. The circuit comprises a diode connected to the power supply with the output connection being connected to a voltage regulator which is in turn connected to receiving means of the system. A storage capacitor is provided and has one end connected between the output connection and ground so that in the event of a sudden voltage drop in power supply the voltage across the diode will be reversed to thereby cease current flow therethrough and allow the storage capacitor to supply the output connection. Current limiting means may be connected between the diode and the output connection.

8 Claims, 5 Drawing Figures

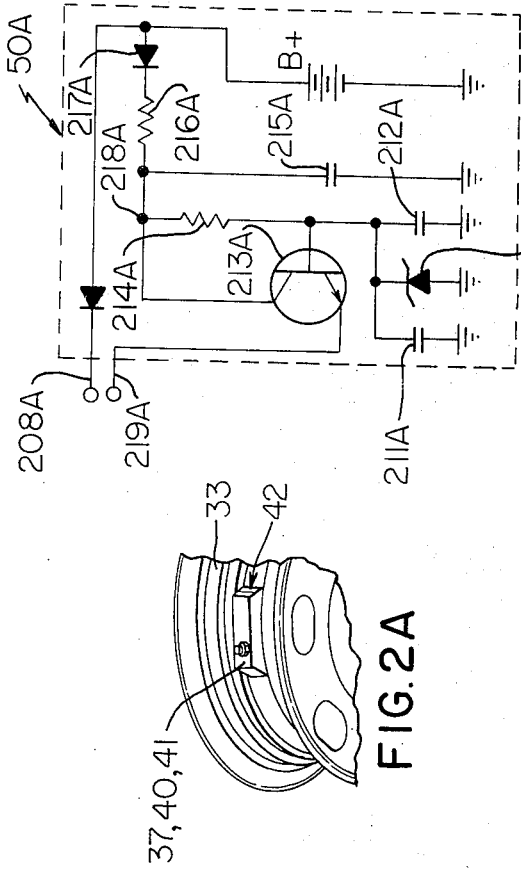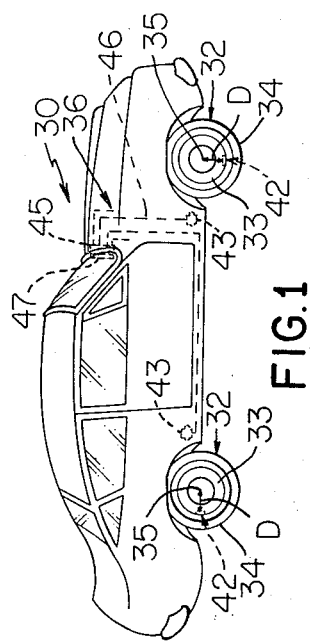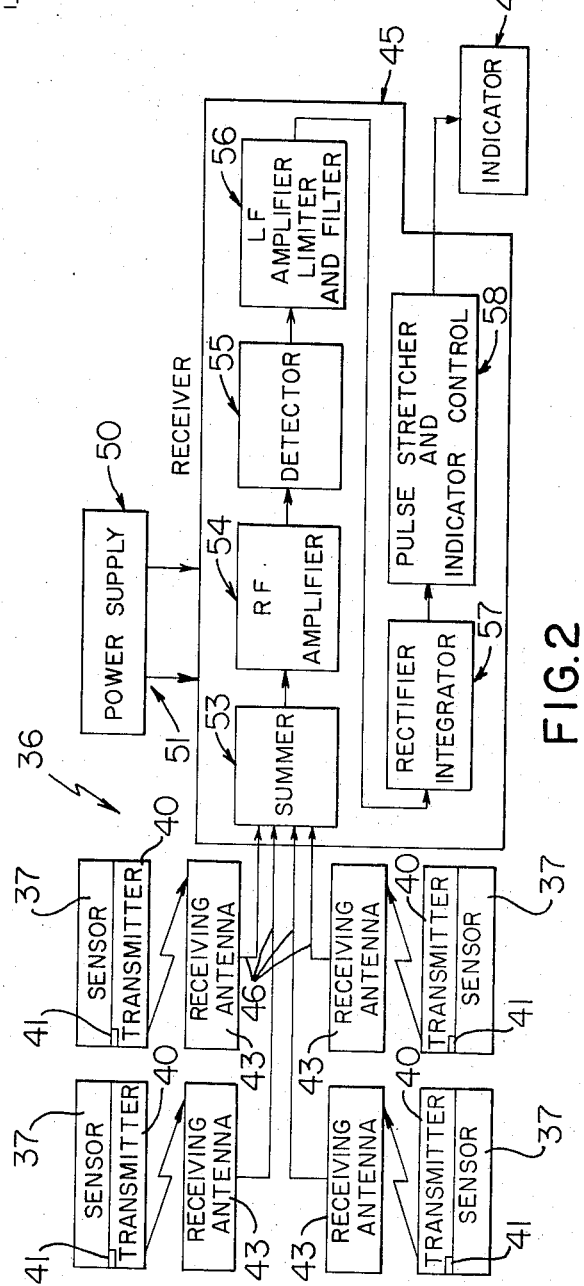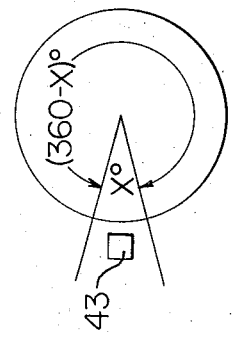

3,812,458

POWER SUPPLY WITH UNIDIRECTIONAL CURRENT FLOW FOR A PNEUMATIC TIRE LOW PRESSURE MONITORING AND WARNING SYSTEM

BACKGROUND OF THE INVENTION

In a pneumatic tire low pressure monitoring and warning system which has means receiving signals from an associated transmitter with such signals being in response to a low pressure condition in an associated pneumatic tire, it is important that such receiving means be provided with a substantially constant voltage free of voltage drops even for short periods. Such voltage drops are often caused by extraordinary demands on the usual battery comprising a vehicle employing such system by various electrical components of the vehicle.

SUMMARY

This invention provides an improved electrical circuit for eliminating severe voltage fluctuations in a battery power supply while providing a substantially constant voltage to an associated output connection and a pneumatic tire low pressure monitoring and warning system using such circuit. The circuit comprises a diode connected to said power supply with the output connection being connected to a voltage regulator which is in turn connected to receiving means of the system. A storage capacitor is provided and has one end connected between the output connection and ground so that in the event of a sudden voltage drop in the power supply the voltage across said diode will be reversed to thereby cease current flow therethrough and allow the storage capacitor to supply the output connection. Current limiting means may be connected between said diode and said output connection.

Other details, uses, and advantages of this invention will be readily apparent from the embodiments thereof presented in the following specification, claims, and drawing.

BRIEF DESCRIPTION OF THE DRAWING

The accompanying drawing shows a present preferred embodiment of this invention, in which;

FIG. 1 is a perspective view illustrating an exemplary motor vehicle utilizing one embodiment of a pneumatic tire low pressure monitoring and warning system which employs the improved electrical apparatus of this invention;

FIG. 2 is a schematic presentation of the exemplary system utilized in the vehicle of FIG. 1;

FIG. 2A is a fragmentary view of a typical assembly comprised of a sensor, transmitter, and battery comprising the system of FIG. 2 with such assembly being mounted on a hub of one of the tires of the vehicle of FIG. 1;

FIG. 2B is a schematic diagram highlighting that each receiving antenna receives a useable signal only during an angular portion of each rotation of its associated transmitter; and FIG. 3 is a schematic electrical diagram of the improved electrical apparatus of this invention.

DESCRIPTION OF THE OVERALL SYSTEM

Reference is now made to FIG. 1 of the drawing which illustrates a motor vehicle shown in this example of the invention as a four-wheeled passenger automobile 30 of well known construction which has a plurality of four wheel assemblies 32 and each wheel assembly 32 is comprised of a rotatable support in the form of a hub or rim 33 with each hub 33 carrying an associated tubeless tire 34, in a well known manner, which is inflated to a predetermined pressure with a suitable fluid such as ambient air. Each wheel assembly 32 is rotatable about an associated central axis of rotation 35 whereby the associated hub 33 and tire 34 are similarly rotatable about such central axis and in a well known manner. The vehicle 35 is powered by a suitable engine which usually drives two of the wheel assemblies 32, either the front or rear two, and the vehicle 30 utilizes one exemplary embodiment of the pneumatic tire low pressure monitoring and warning system of this invention which is designated generally by the reference numeral 36 and such system serves to warn the operator of the vehicle 30 in the event of an abnormally low fluid pressure, pneumatic pressure in this example, in any one of the four tires 34 and in a manner which will be presented in detail hereinafter.

For convenience and ease of presentation the exemplary system 36 has been illustrated as being used on a vehicle in the form of a passenger-type automobile having a plurality of four tubeless tires each of which is inflated to a predetermined pressure. However, it will be appreciated that the system is fully applicable to all types of vehicles employing either tubeless or tube-type pneumatic tires, or the like, including buses, trucks, trailers, and similar vehicles.

The system 36 comprises a plurality of four sensing means or sensors 37, see FIG. 2, and each sensor 37 is carried by an associated wheel assembly 32 and is preferably suitably installed on the hub 33 of its associated wheel assembly in a fixed manner. The detailed construction and operation of a typical sensor 37 will be presented subsequently.

The system 36 comprises a plurality of transmitters 40, each operatively connected to and being activated or actuated by an associated sensor 37 and in this example the sensor 37 and transmitter 40 associating with a particular wheel assembly 32 is provided with a self-contained power source in the form of a battery 41 and the sensor 37, transmitter 40, and battery 41 of each particular wheel assembly is provided as a single unit or assembly which is designated generally by the reference numeral 42, see FIG. 2A. The assembly 42 may be suitably installed within its associated hub 33 by threaded bolt, welding, or the like, and as a practical matter the assembly 42 and hence its transmitter 40 is located at a position which is radially displaced by a distance D from the central axis of rotation 35 of its wheel assembly 32, see FIGS. 1 and 2A.

The sensor 37 is comprised of a sealed pressurized hemispherical dome which dimples in a substantial predetermined manner when it is exposed to an external pressure greater than a predetermined minimum. The dimple action serves as a normally open electrical snap switch which closes by "oil can" action whenever the external pneumatic pressure falls below the predetermined minimum pressure which in reality is the minimum air pressure required to assure satisfactory operation of the associated tire 34.

The transmitter 40, which will also be referred to as oscillator 40, is actuated by the snap action of its sensor 37 whereby the associated battery 41 provides electrical power for the oscillator 40. The oscillator 40 is a self-pulsed oscillator which generates a radio frequency (RF) signal with distinct, readily identifiable characteristics to eliminate false alarms. The oscillator utilizes a tank circuit having a coil which is unshielded and unobstructed to the greatest extent possible to establish an external magnetic alternating near field and thereby use such coil as the transmitting antenna. Each transmitter 40 operatively associates with an associated one of four fixed receiving antennas 43 comprising the system 36 and the antennas 43 will be described in detail subsequently.

For certain applications where it may be desired to take advantage of the minimal licensing requirements in the so-called citizen's band of radio frequencies ranging between 26.97 – 27.27 megahertz (Mhz), the oscillator frequency may be located within this band and the transmitter 40 then utilizes near field transmission. The median frequency in this band is 27.12 Mhz which corresponds to a wave length of 36.26 feet and such distance is considerably greater than the distance required for the system 36 of this invention to span from a hub 33 of any particular wheel assembly 32 of a vehicle using system 36 to a location on such vehicle where an antenna for the system is likely to be located.

The use of near field transmission has the distinct advantages that in the near field zone the stationary field is of greater magnitude than the traveling field, and attenuation of the stationary field per unit of distance is greater than that for the traveling field whereby interference with adjacent electrical apparatus as well as the electrical apparatus of the vehicle 30 is minimized. Further, because transmission basically may be considered as the coupling between a stationary coil on a receiving antenna 43 and a rotating coil of an associated transmitter 40, such transmission will be controlled by the coupling factor whereby maximum magnetic coupling will provide maximum transmission.

Because of practical considerations of economy and simplicity in detecting a low pressure condition in a rotating pressurized tire, each transmitter assembly 42 and its transmitter 40 is preferably located off center, as indicated earlier, by the distance D from the central axis of rotation 35 of its associated wheel assembly 32 and hub 33. However, the assembly 42 is of small weight (roughly an ounce) and the weight thereof may be easily balanced by a regular small size automobile tire balancing weight, if desired.

With off center mounting, the previously mentioned coupling factor between a rotating transmitter 40 and the fixed coil of its receiving antenna 43 varies considerably as each wheel assembly rotates because of the variation in distance between such coils, changes in relative orientation between the coils, and the differences in shielding interposed between the coils at different relative positions thereof. As a result of these factors the transmitted output signal from the transmitter 40 is of sufficient strength to be useable only during a portion of each revolution or rotation of its wheel assembly 32. Stated in another manner, because each receiving antenna 43 is attached at a fixed position on the vehicle adjacent its wheel assembly 32, the antenna 43 receives a useable output signal from the transmitter only during a portion of each complete rotation of the transmitter therepast. However, since it is known that the magnetic near field varies inversely as the third power of distance, then the received signal during part of the rotation will be substantially stronger than the received signal would be if a more constant transmission distance was selected. The system 36 utilizes a receiver 45 which is operatively connected to each receiving antenna 43 by an associated coaxial cable 46 and the receiver employs unique means for increasing the effective time duration of the useable portions of the output signals from the transmitter 40 to activate or otherwise energize an associated indicator 47 comprising system 36 and such indicator is operatively connected to the receiver 45 in a manner to be described.

The indicator 47 may be of any suitable type. For example, such indicator may be in the form of a light which is observed visually or such indicator may be in the form of an audible indicator such as a bell or buzzer.

The system 36 in addition to the batteries 41 comprising assemblies 42, also has a power source for its receiver 45 and such power source is designated generally by the reference numeral 50 and is suitably operatively connected to the receiver 45 as illustrated at 51. The power source 50 may comprise any suitable source of power and in this example is the usual battery provided for the vehicle 30.

Each transmitter 40 is energized by a low pressure indication as determined by its sensor 37 and will provide continuous pulsed output signals. In general, only during certain time intervals associated ones of these signals are of sufficient strength that they are readily received by an associated receiving antenna 43 and as will now be explained particularly in connection with FIGS. 1 and 2B.

Under conditions wherein the vehicle 30 is standing still, the signal from a transmitter 40 is processed through the receiver 45 and may activate the indicator 47, such as an indicator lamp 47, so that the lamp 47 is ON or OFF depending upon the relative location of the transmitter 40 and receiving antenna 43. In those instances when the vehicle 30 is moving at a relatively low speed, the indicator lamp 47 will be turned ON and OFF sequentially; however, it has been found that the lamp 47, in this case, is turned ON for a sufficiently long time interval to assure full brightness and, conversely, when such lamp is turned OFF it is extinguished completely. With the vehicle moving at such slow speeds, the pulse of light will therefore be fully visible and the low pulse repetition rate will result in a flickering action by the lamp 47. If the vehicle 30 is moving at higher speeds the lamp 47 may be turned ON for a time period which is insufficient to insure full brightness. This performance of the lamp at higher vehicle speeds in combination with the higher pulse repetition rate due to faster rotation reduces the flickering; however, the total perceptible light may be inadequate to be used as an indicator.

To highlight this situation reference is made to FIG. 2B of the drawings wherein it is seen that for each full rotation of a wheel the transmission level is high enough to activate or light the indicator lamp 47, for $X$ degrees while such lamp is dark for the remaining $(360-X)°$. By way of an example, $X$ may be 30°, in which case the indicator lamp will be dark for a period roughly 11 times as long as the lighted period. Thus, it can be readily seen that an operating transmitter 40 used in a pneumatic tire of a given size will generate a signal having a particular pulse frequency determined by the emission characteristics of the transmitter and the speed of the vehicle. It is also apparent that the performance of the indicator 47 may be substantially improved if the indicator ON time or the time that it is activated is increased relative to its OFF time. In particular, the performance of the indicator 47 may be substantially improved if the effective time duration of a useable signal received by each receiving antenna 43 is increased and this may be achieved by a technique referred to popularly as pulse stretching and means for achieving such pulse stretching is provided in the receiver 45.

The receiver 45 minimizes false alarms by rejecting potentially false alarm inputs including; power supply disturbances generated by the electrical equipment of the vehicle 30, including the starter, horn, window washer, windshield wipers, key alarms, etc.; RF signals generated by natural atmospheric electrical disturbances such as static; RF signals generated by the above-mentioned electrical equipment of the vehicle 30; RF signals generated by electrical equipment external to the vehicle; voice-modulated as well as continuous-wave signals within the selected RF transmission band; and modulated as well as continuous-wave RF signals outside the selected band. Conversely, the RF receiver 45 very reliably recognizes and activates the indicator 47 when receiving a pneumatic tire low pressure warning signal in the form of an RF signal having all of the following characteristics of being in the selected RF band, being an RF signal which is pulsating at the predetermined frequency defined by the self-pulsed oscillator, and being an RF signal which is pulsating at a rate and with a pulse width determined by the angle $X$ of rotation over which a recognizable signal is received in combination with the rotational velocity of an associated wheel assembly 32 of the vehicle 30.

The receiver 45 has an RF pass band which is reduced to a minimum compatible with assured inclusion of the selected RF band under all environmental conditions and has means minimizing or eliminating the above-mentioned false alarm inputs while assuring recognition of a signal indicating a low tire pressure and as will be apparent from the following description. In particular, the receiver 45 has a summer 53 which receives RF signals from an RF transmission line 46 in the event of a low pressure condition in a vehicle tire associated therewith and such signals are then fed to an RF amplifier 54. The amplifier 54 employs a plurality of two transformer coupled stages having tuned primaries and untuned secondaries to amplify the RF signal whereby RF amplification is held at a minimum in view of its relatively high cost and regeneration problems usually associated therewith. The signals from the RF amplifier 54 are fed to a diode amplitude detector 55 which is forward biased to facilitate its ability to perform at very low signal levels and the detector 55 is followed by a low frequency (LF) amplifier, limiter, and filter circuit 56 which serves to attenuate undesired signals. The circuit 56 is a combination LF limiter/band pass amplifier which prevents LF signals on frequencies outside the predetermined frequency band of the oscillator from reaching a level which may activate the indicator. The circuit 56 is followed by a rectifier-integrator circuit 57 which integrates the LF pulses in the pulse train. This circuitry will insure that a pulse train rather than noise spikes is required to activate the indicator while the shortest authentic pulse train will suffice to let the rectified voltage reach a level which will activate succeeding or downstream circuits in the receiver. The circuit 57 thus serves to eliminate the effect of noise spikes and provides more reliable operation the longer the required integration time can be made. The circuit 57 is followed by a pulse stretcher and indicator control circuit 58 and this circuit is particularly useful in overcoming the effect of short trains of pulses. The circuit 58 serves as means for increasing the effective time duration of useable ones of the output signals provided to RF receiver 45 by receiving antennas 43 and insures that a satisfactory indicator signal is provided to the indicator 47. The pulse stretcher 58 is inherently a regenerative device whereby it also increases the sensitivity of the RF receiver since any signal which is capable of activating the pulse stretcher will provide a saturated output signal. The circuit 58 activates indicator 47 to warn the operator of the vehicle 30 in the event of a low pressure condition in any one of the vehicle tires. The receiver 45 also has suitable means in its power supply 50 for filtering such power supply to reduce power supply line disturbances to a tolerable level.

Having described the general operation of the system 36 in connection with the exemplary vehicle 30, a detailed description will now be presented of an improved electrical apparatus or power supply 50A which includes the usual battery power source of the vehicle 30 and such apparatus assures that a substantially constant voltage is supplied to the receiving means of system 36 with such receiving means being defined by receiver 45 and indicator 47.

POWER SUPPLY 50A

The power supply apparatus or circuit 50A is illustrated in FIG. 3 of the drawing and employs a voltage regulator circuit comprised of a Zener diode 210A connected in parallel with an RF bypass capacitor 211A and an LF bypass capacitor 212A and this parallel combination is connected between the base electrode or base of a transistor 213A and ground. A bleeder resistor 214A provided between the collector electrode or collector of transistor 213A and its base assures that the base is maintained at the selected Zener voltage which may be of the order of 9.1 volts for the receiver 45. The emitter electrode or emitter of transistor 213A may be connected to a portion (such as the rectifier-integrator) of the receiver 45 by a lead 219A.

The characteristics of the transistor 213A are such that the minimum output voltage will be held constant at a voltage slightly lower than 9.1 volts, and the capacitance loading across the Zener diode will constitute an effective capacitance load across the output equal to the actual capacitance value multiplied by the amplification factor of the transistor 213A. Voltage variation and voltage ripple on the output lead 219A will be eliminated or minimized due in part to the voltage regulation performed by the transistor 213A and due in part to the large effective capacitance across the output. However, it is evident that the transistor cannot function if its collector voltage drops below its base voltage and that in consequence the voltage regulation ceases.

It has been found that the battery power supply in a motor vehicle (such as a passenger automobile, truck, bus, etc.) exhibits substantial voltage drops for short periods reaching almost zero voltage under certain vehicle operating conditions whereby such disturbances will normally be reflected directly into the regulated voltage. However, these performance deficiencies are minimized or substantially eliminated by placing a diode 217A, as a conductor, in the lead between the primary battery power supply or B+ and the regulated power supply shunted by a capacitor 215A. In the event of sudden voltage drops in the primary voltage or B+ supply, the voltage across the diode will be reversed whereby current flow through the diode will cease and the requirements of the regulated power supply will be furnished by the storage capacitor 215A. Therefore, it is seen that with this simple addition of diode 217A and capacitor 215A together with current limiting means, if desired, in the form of a load resistor 216A connected between the diode 217A and connection 218A connected to the base of the transistor 213A, drastic voltage drops are substantially eliminated and the requirements of the regulated power supply are furnished by the storage capacitor 215A. The power supply 50A is also connected to the pulse stretcher, indicator control 58 and indicator 47 by a lead 208A and a ground connection.

While present exemplary embodiments of this invention, and methods of practicing the same, have been illustrated and described, it will be recognized that this invention may be otherwise variously embodied and practiced within the scope of the following claims.

What is claimed is:

1. In combination a power supply for an RF receiver of a pneumatic tire low pressure monitoring and warning system, said pneumatic tire being attached to an associated vehicle by a rotatable support, said vehicle having a storage battery as the source of power for the electrical equipment of said vehicle; said pneumatic tire low pressure monitoring and warning system comprising: a pressure sensor; a battery powered RF transmitter attached to said rotatable support and rotated therewith; receiving means including an antenna and transmission line; an RF receiver including indicating means; said RF transmitter being activated by said pressure sensor in response to a low tire pressure condition in said tire and thereupon generating RF output signals; said RF receiver providing a low pressure indication in response to said RF output signals; said RF receiver being powered by said storage battery in said vehicle and thereby being exposed to the power supply disturbances resulting from the operation of electrical equipment in said vehicle, said RF receiver including a unidirectional power supply comprising: a voltage regulator supplying a substantially constant preselected output voltage to said RF receiver; electrical storage means for the storing of electrical power for use by said voltage regulator; said electrical storage means connected to said storage battery by a unidirectional current circuit thereby assuring that the electrical energy stored in said electrical storage means is reversed for the use of said RF receiver and further assuring that the input voltage to said voltage regulator does not drop below said preselected output voltage.

2. A power supply for an RF receiver as set forth in claim 1 in which said unidirectional current circuit comprises a diode and in which said electrical storage means comprises an electrical capacitor; said diode being connected between said storage battery and one side of said capacitor and to the input of said voltage regulator, the opposite side of said capacitor being connected to ground so that in the event of a sudden drop in the voltage supplied by said storage battery, the voltage across said diode will be reversed to thereby cease the current flow therethrough and thus reserve the electrical energy stored in said capacitor for the sole use of said voltage regulator.

3. A power supply for an RF receiver as set forth in claim 2 in which current limiting means are connected in series with said diode to insure that the charging current for said capacitor, following a voltage reversal across said diode, does not exceed the maximum allowable current for said diode.

4. A power supply for an RF receiver as set forth in claim 3 in which said current limiting means comprises a resistor.

5. A power supply for an RF receiver as set forth in claim 2 in which said voltage regulator comprises: a transistor having collector, emitter and base electrodes and a voltage reference circuit, said voltage reference circuit comprising a Zener diode connected in parallel with a bypass and loading capacitor; said collector electrode being connected to the storage capacitor and exposed to the voltage thereon; and said emitter electrode being connected to said receiving means; and said base electrode being connected to said voltage reference circuit.

6. A power supply for an RF receiver as set forth in claim 5 in which said bypass and loading capacitor comprises an LF bypass and loading capacitor and an RF bypass capacitor.

7. A power supply for an RF receiver as set forth in claim 5 in which said voltage regulator further comprises a bleeder resistor connected between said collector and base electrodes to maintain a fixed reference voltage across said Zener diode.

8. A power supply for an RF receiver as set forth in claim 3 in which said storage battery supply provides an unregulated voltage generally of the order of 15 volts and subject to severe disturbances and said voltage regulator provides a regulated and filtered output voltage generally of the order of 9.0 Volts through the emitter electrode of said transistor.

* * * * *